United States Patent
Anand et al.

(10) Patent No.: US 8,914,801 B2
(45) Date of Patent: Dec. 16, 2014

(54) HARDWARE INSTRUCTIONS TO ACCELERATE TABLE-DRIVEN MATHEMATICAL COMPUTATION OF RECIPROCAL SQUARE, CUBE, FORTH ROOT AND THEIR RECIPROCAL FUNCTIONS, AND THE EVALUATION OF EXPONENTIAL AND LOGARITHMIC FAMILIES OF FUNCTIONS

(75) Inventors: Christopher K. Anand, Dundas (CA);
Robert F. Enenkel, Markham (CA);
Anuroop Sharma, Hamilton (CA);
Daniel M. Zabawa, Toronto (CA)

(73) Assignee: International Business Machine Corporation, Armonk, NY (US)

( * ) Notice: Subject to any disclaimer, the term of this patent is extended or adjusted under 35 U.S.C. 154(b) by 1027 days.

(21) Appl. No.: 12/788,570

(22) Filed: May 27, 2010

(65) Prior Publication Data

US 2011/0296146 A1   Dec. 1, 2011

(51) Int. Cl.
*G06F 17/00* (2006.01)
*G06F 9/30* (2006.01)
*G06F 9/38* (2006.01)

(52) U.S. Cl.
CPC .......... *G06F 9/3001* (2013.01); *G06F 9/3893* (2013.01)
USPC .......................................... 718/102; 708/495

(58) Field of Classification Search
USPC .......................................... 712/222; 708/495
See application file for complete search history.

(56) References Cited

U.S. PATENT DOCUMENTS

| 6,240,433 | B1 | 5/2001 | Schmookler et al. |
| 6,453,065 | B1 * | 9/2002 | Lapidous et al. ............. 382/154 |
| 7,225,323 | B2 * | 5/2007 | Siu et al. ....................... 712/222 |
| 7,346,642 | B1 | 3/2008 | Briggs et al. |
| 2007/0074008 | A1 * | 3/2007 | Donofrio ...................... 712/222 |
| 2008/0243985 | A1 | 10/2008 | Tang et al. |
| 2008/0263336 | A1 | 10/2008 | Dhong et al. |

OTHER PUBLICATIONS

Wikipedia.org ("Trigonometric Functions"). Version dated Apr. 27, 2010. 21 pages.*

Ramesh C. Agarwal, et al, ; "New scalar and vector elementary functions for the IBM System/370," Mar. 1986; pp. 126-144, vol. 30, No. 2., IBM J. Res. Develop.

(Continued)

*Primary Examiner* — Robert Fennema
(74) *Attorney, Agent, or Firm* — J. B. Kraft; Steven L. Bennett (57) ABSTRACT

A set of instructions for implementation in a floating-point unit or other computer processor hardware is disclosed herein. In one embodiment, an extended-range fused multiply-add operation, a first look-up operation, and a second look-up operation are each embodied in hardware instructions configured to be operably executed in a processor. These operations are accompanied by a table which provides a set of defined values in response to various function types, supporting the computation of elementary functions such as reciprocal, square, cube, fourth roots and their reciprocals, exponential, and logarithmic functions. By allowing each of these functions to be computed with a hardware instruction, branching and predicated execution may be reduced or eliminated, while also permitting the use of distributed instructions across a number of execution units.

10 Claims, 6 Drawing Sheets

(56) References Cited

OTHER PUBLICATIONS

Christopher Kumar Anand et al., "Synthesizing and Verifying Multicore Parallelism in Categories of Nested Code Graphs," Aug. 1, 2008; pp. 3-46, Alexander/Process Algebra for Parallel and Distributed Processing C6486_C001.

Christopher Kumar Anand et al., "An Optimized Cell BE Special Function Library Generated by Coconut," preprint 2009, pp. 1-13, vol. 58,, IEEE Transactions on Computers.

Christopher Kumar Anand et al., "Unified Tables for Exponential and Logarithm Families," May 2009, AdvOL-Report No. 2009/02, pp. 1-20, McMaster University, Advanced Optimization Laboratory, Hamilton, Ontario, Canada.

Pieter Bellens et al., "CellSs: a Programming Model for the Cell BE Architecture," 2006, pp. 11 pages, Barcelona Supercomputing Center and UPC, Barcelona, Spain.

R. W. Bemer, "A Note on Range Transformations for Square Root and Logarithm," Jun. 1963, pp. 306-307, vol. 6, No. 6, Communications of the ACM, New York, NY.

Son Dao Trong et al., "P6 Binary Floating-Point Unit," 2007, 10 pages, 18th IEEE Symposium on Computer Arithmetic, IEEE Computer Society.

Nicolas Brisebarre et al., "Efficient polynomial L-infinity approximations," 2007, 8 pages, 18th IEEE Symposium on Computer Arithmetic, Santa Monica, USA, IEEE Computer Society Press, Los Alamitos, CA.

Shmuel Gal et al., "An Accurate Elementary Mathematical Library for the IEEE Floating Point Standard," Mar. 1991, pp. 26-45, vol. 17, No. 1, IBM Israel Science and Technology and Scientific Center, ACM Transactions on Mathematical Software.

Alan H. Karp et al., "High-Precision Division and Square Root," Dec. 1997, pp. 561-589, vol. 23, No. 4, Hewlett-Packard Laboratories, ACM Transactions on Mathematical Software.

Peter Kornerup et al., "Choosing starting values for certain Newton-Raphson iterations," 2006, pp. 101-110, 351(1); Theoretical Computer Science.

David M. Russinoff, "A Mechanically Checked Proof of IEEE Compliance of the Floating Point Multiplication, Division and Square Root Algorithms of the AMD-K7 Processor," 1998, pp. 148-200, ISSN 1461-1570, LMS J. Computer Math 1, London Mathematical Society.

Ramesh C. Agarwal et al., "Series Approximation Methods for Divide and Square Root in the Power 3 Processor," 1999, 8 pages, in ARITH 99: Proceedings of the 14th IEEE Symposium on Computer Arithmetic, Washington, DC., IEEE Computer Society.

Eric M. Schwarz, "Rounding for Quadratically Converging Algorithms for Division and Square Root," 1995, pp. 600-603, ASILOMAR 95: Proceedings of the 29th ASILOMAR Conference on Signals, Systems and Computers (2-Volume Set), Washington, DC, IEEE Computer Society.

Naofumi Takagi, "Generating a Power of an Operand by a Table Look-up and a Multiplication," 1997, pp. 126-131, ARITH 97: Proceedings of the 13th Symposium on Computer Arithmetic (ARITH' 97), Washington, DC, IEEE Computer Society.

* cited by examiner

Fig. 1

| a/b | normal | subnormal | $+\infty$ | $-\infty$ | $\pm 0$ |
|---|---|---|---|---|---|
| finite > 0 | $\frac{2^{-e}}{c}, \frac{2^{-e}}{c}$ | $\frac{2^{-e+52}}{c}, \frac{2^{-e+52}}{c}$ | 0, 0 | 0, 0 | $\pm\infty, \pm\infty$ |
| finite < 0 | $\frac{2^{-e}}{c}, \frac{2^{-e}}{c}$ | $\frac{2^{-e+52}}{c}, \frac{2^{-e+52}}{c}$ | 0, 0 | 0, 0 | $\mp\infty, \mp\infty$ |
| $\infty$ | $\frac{2^{-e}}{c}, \frac{2^{-e}}{c}$ | $\frac{2^{-e+52}}{c}, \frac{2^{-e+52}}{c}$ | 0, NaN | 0, NaN | $\pm\infty, \pm\infty$ |
| $-\infty$ | $\frac{2^{-e}}{c}, \frac{2^{-e}}{c}$ | $\frac{2^{-e+52}}{c}, \frac{2^{-e+52}}{c}$ | 0, 0 | NaN, 0 | NaN, $\mp\infty$ |
| $\pm 0$ | $\frac{2^{-e}}{c}, \frac{2^{-e}}{c}$ | $\frac{2^{-e+52}}{c}, \frac{2^{-e+52}}{c}$ | 0, NaN | 0, 0 | 0, NaN |

Fig. 2

| function | $-\infty$ | $\pm 0$ | $< 0$ |
|---|---|---|---|
| recip | 0, 0 | 0, $\pm\infty$ | $-\frac{2^{-e}}{c}, -\frac{2^{-e}}{c}$ |
| sqrt | 0, NaN | 0, 0 | 0, NaN |
| rsqrt | 0, NaN | 0, $\infty$ | 0, NaN |
| log2 | 0, NaN | 0, $-\infty$ | 0, NaN |
| exp2 | NaN, 0 | 0, 1 | $c, 2^{-1} \cdot 2^c$ |

| function | normal $> 0$ | subnormal $> 0$ | $+\infty$ |
|---|---|---|---|
| recip | $\frac{2^{-e}}{c}, \frac{2^{-e}}{c}$ | $\frac{2^{-e+52}}{c}, (\frac{2^{-e}}{c})_{saturated}$ | 0, 0 |
| sqrt | $\frac{2^{-e}}{c}, \frac{2^{e/2}}{c}$ | $\frac{2^{-e+52}}{c}, \frac{2^{e/2}}{c}$ | 0, $\infty$ |
| rsqrt | $\frac{2^{-e}}{c}, \frac{2^{-e/2}}{c}$ | $\frac{2^{-e+52}}{c}, \frac{2^{-e/2}}{c}$ | 0, 0 |
| log2 | $\frac{2^{-e}}{c}, e + \log_2 c$ | $\frac{2^{-e+52}}{c}, e-52+\log_2 c$ | 0, $\infty$ |
| exp2 | $c, 2^1 \cdot 2^c$ | 0, 1 | 0, $\infty$ |

Fig. 3

| +ext | finite | -∞ | ∞ | NaN |
|---|---|---|---|---|
| finite | c | c | c | 0 |
| -∞ | c | c | 0 | 0 |
| ∞ | c | 0 | c | 0 |
| NaN | c | c | c | 0 |

| ×ext | finite≠0 | ∓0 | -∞ | ∞ | NaN |
|---|---|---|---|---|---|
| finite≠0 | c | ∓0 | -∞ | ∞ | NaN |
| ∓0 | ∓0 | c | ∞ | ∞ | NaN |
| -∞ | -∞ | ∞ | ∞ | -∞ | NaN |
| ∞ | ∞ | ∞ | -∞ | ∞ | NaN |
| NaN | NaN | NaN | NaN | NaN | NaN |

HARDWARE INSTRUCTIONS TO ACCELERATE TABLE-DRIVEN MATHEMATICAL COMPUTATION OF RECIPROCAL SQUARE, CUBE, FORTH ROOT AND THEIR RECIPROCAL FUNCTIONS, AND THE EVALUATION OF EXPONENTIAL AND LOGARITHMIC FAMILIES OF FUNCTIONS

FIELD OF THE INVENTION

The present invention generally relates to computer processing of mathematical functions. The present invention more specifically relates to instructions implemented in computer processor hardware used for mathematic computations.

BACKGROUND OF THE INVENTION

Elementary functions are mathematical functions such as square root, logarithm, exponential, etc., that are widely used in high performance computing (HPC) applications, scientific computing, and financial applications. The speed of elementary function evaluation often has a significant effect on the overall performance of such applications, making accelerated elementary function libraries an important factor in achieving high-performance on hardware.

Elementary function libraries, such as IBM MASS (Mathematical Acceleration SubSystem), are often called from performance critical code sections, and hence contribute greatly to the efficiency of numerical applications. Not surprisingly, such functions are heavily optimized both by the software developer and the compiler, and processor manufacturers provide detailed performance results which potential users can use to estimate the performance of new processors on existing numerical workloads.

Changes in processor design require such libraries to be re-tuned. For example, hardware pipelining and superscalar dispatch will favor implementations which use more instructions, and have longer total latency, but which distribute computation across different execution units and present the compiler with more opportunities for parallel execution. Additionally, Single-Instruction-Multiple-Data (SIMD) parallelism, and large penalties for data-dependent unpredictable branches favor implementations which handle all cases in a branchless loop body over implementations with a fast path for common cases and slower paths for uncommon, e.g., exceptional, cases. The present disclosure provides enhanced performance with these architectures through the use of elementary function algorithms and hardware instructions to accelerate such algorithms and simplify their use.

BRIEF SUMMARY OF THE INVENTION

The present disclosure provides an addition to the instruction set architecture for both scalar and vector/SIMD instructions to support the computation of reciprocal, square, cube, and fourth roots and their reciprocals, and the evaluation of exponential and logarithmic families of functions. (Exponential and logarithmic families includes functions such as base-2, base-10, and base-e exponential and logarithm, as well as the variants expm1 and log 1p for each base.) The acceleration of these core functions in turn accelerates other functions which depend on them, such as power, hyperbolic and inverse hyperbolic trigonometric functions. The new hardware instructions disclosed herein enable exception handling at no additional cost in execution time, and scale linearly with increasing superscalar and SIMD widths. Based on reduced instruction and constant counts and reduced register pressure, compilers with access to these instructions may be optimized to always in-line such functions, eliminating function-call overhead.

Hardware-based seeds for iterative root and reciprocal computations have been supported on common architectures for some time, and as a result iterative methods are preferred for these computations, although other table-based methods also exist. The present invention provides an improved method of computation of iterative root and reciprocal computation through the use of an extended-range floating-point multiply-add instruction and table look-up instructions retrieving values from two tables. By unifying the number of tables needed for all exponential and logarithm computations to two, an incentive is provided to accelerate such computations widely in hardware.

As detailed in the following disclosure, accelerating such functions by providing hardware-based tables has another advantage: all exceptions can be handled at minimal computational cost in hardware, thus eliminating all branches (and predicated execution) in these functions. This is especially beneficial for SIMD parallelism. The resulting instruction counts dramatically reduce the barriers to in-lining these math functions, which further improve performance. The new instructions may also result in reduced power consumption for applications calling these functions.

As disclosed herein, three new instructions which calculate elementary mathematical functions are defined for use in a hardware implementation. This disclosure further demonstrates how these instructions may be combined with floating-point instructions to calculate any relevant special functions. These new instructions will outperform existing estimate instructions commonly used for reciprocal and reciprocal square root, and may even double the throughput for functions based on exponentials and logarithms. Combined with the use of specific algorithms, this may result in an up to four-fold throughput increase for processors implementing these instructions.

In one specific embodiment disclosed herein, a processor for a computer system includes a floating-point arithmetic unit having a table and floating-point instructions used for computation of mathematical functions, such as reciprocals, square roots, cube roots, fourth roots, and exponential and logarithmic families of functions. The table is configured to provide values for processing either special or elementary mathematical functions provided to the processor. This table may be further configured to supply values for exceptional results (such as substituting $+\infty$, $-\infty$, 0, $-0$, or NaN as applicable).

In this embodiment, three floating-point instructions are provided. The first floating-point instruction (lookup) is used to look-up a first value from a table for use in the first stage of evaluation of a mathematical function. The second floating-point instruction (retrieve) is used to retrieve a second value for use in the second stage of evaluation of the mathematical function, the second value retrieved from the table being based on the evaluation of the mathematical function at a value related to the first value obtained from the first floating-point instruction. The third floating-point instruction (fmaX) is used to perform an extended-range fused multiply-add operation on the mathematical function, with the extended-range fused multiply-add operation typically performing the range reduction on the mathematical function using the first value. This range reduction may be additive or multiplicative depending on the mathematical function. With use of these instructions, the floating-point arithmetic unit may compute values on the mathematical function with a single iteration of the instructions. Further, the instructions may be executed in the processor without branching.

In further embodiments, the third floating-point instruction is defined to accept a first argument having 12 exponent bits and 51 mantissa bits, and second and third arguments each being IEEE double-precision numbers with 11 exponent bits and 52 mantissa bits. Likewise, the first floating-point instruction may be defined to accept one or two arguments and an immediate argument specifying the table within the floating-point arithmetic unit. The second floating-point instruction may also perform a lookup using the same input as the first floating-point instruction, using a value saved by a lookup from a FIFO queue, or using a value saved in a slot according to an immediate tag provided to the second floating-point instruction. In still a further embodiment, the processor may include a fourth floating-point instruction and a fifth floating-point instruction, the fourth instruction configured to perform a series of fused multiply add (fma) operations and produce a polynomial approximation after the range reduction performed by the third floating-point instruction, and the fifth floating-point instruction configured to perform either a fused multiply add operation (fma) or a multiply (fm) operation to combine the polynomial approximation with the second value.

In another specific embodiment disclosed herein, system for performing mathematical function evaluation includes a plurality of tables, a processing unit including logic interfacing with the plurality of tables, the logic including a set of three hardware instructions for table lookups and an extended-range fused multiply-add operation in accordance with the techniques and structures described herein. Yet another specific embodiment provides a method of using hardware instructions to accelerate table-driven evaluation of mathematical functions in accordance with the techniques and structures described herein.

DETAILED DESCRIPTION OF THE INVENTION

One aspect of the present invention provides a set of new floating-point instructions for implementation in a floating-point arithmetic unit. These instructions may be used to support a set of mathematical function computation algorithms. These instructions provide additional improvement in light of changes in physical processor design that render older implementations ineffective. On the algorithm side, even basic arithmetic computation may be improved—notably by eliminating variable execution times for subnormals. The advantages of the presently disclosed hardware instructions may therefore be extended to computation of a number of important elementary functions.

Driven by hardware implementation, the advent of software pipelining and shortening of pipelining stages favored iterative algorithms. The long-running trend towards parallelism has engendered a search for shared execution units, and in a more general sense, a focus on throughput rather than low latency. This trend motivates the present disclosed technique of combining short-latency seed or table value look-ups with standard floating-point operations, thereby exposing the entire computation to software pipelining by the scheduler.

In proposing Instruction Set Architecture (ISA) extensions, one must consider four constraints: a) the limit on the number of instructions imposed by the size of the machine word, and the desire for fast (i.e. simple) instruction decoding; b) the limit on arguments and results imposed by the architected number of ports on the register file; c) the limit on total latency required to prevent an increase in maximum pipeline depth; and d) the need to balance increased functionality with increased area and power usage.

As new lithography methods cause processor sizes to shrink, the relative cost of increasing core area for new instructions is reduced, especially if the new instructions reduce code and data size. This reduces pressure on the memory interface which is more difficult to scale. Therefore, to achieve a performance benefit, ISA extensions should do one or more of the following: a) reduce the number of machine instructions in compiled code; b) move computation away from bottleneck execution units or dispatch queues; and c) reduce register pressure. In one embodiment, three floating-point instructions are added to a processor or other arithmetic unit for computation of elementary functions.

The first instruction is: d=fmaX a b c. This instruction is further referred to in the following examples and text as fmaX. This instruction performs an extended-range floating-point multiply-add, with the first argument having 12 exponent bits and 51 mantissa bits, and non-standard exception handling.

The second instruction is: t1=lookup a b fn. This instruction is referred to in the following examples and text as lookup. This instruction performs an enhanced table look-up based on one or two arguments, with an immediate argument specifying the table number.

The third instruction is: t2=retrieve. This instruction is referred to in the following examples as retrieve. This instruction performs a second look-up, or a retrieval of a second table value generated by the lookup instruction.

Figure 1:
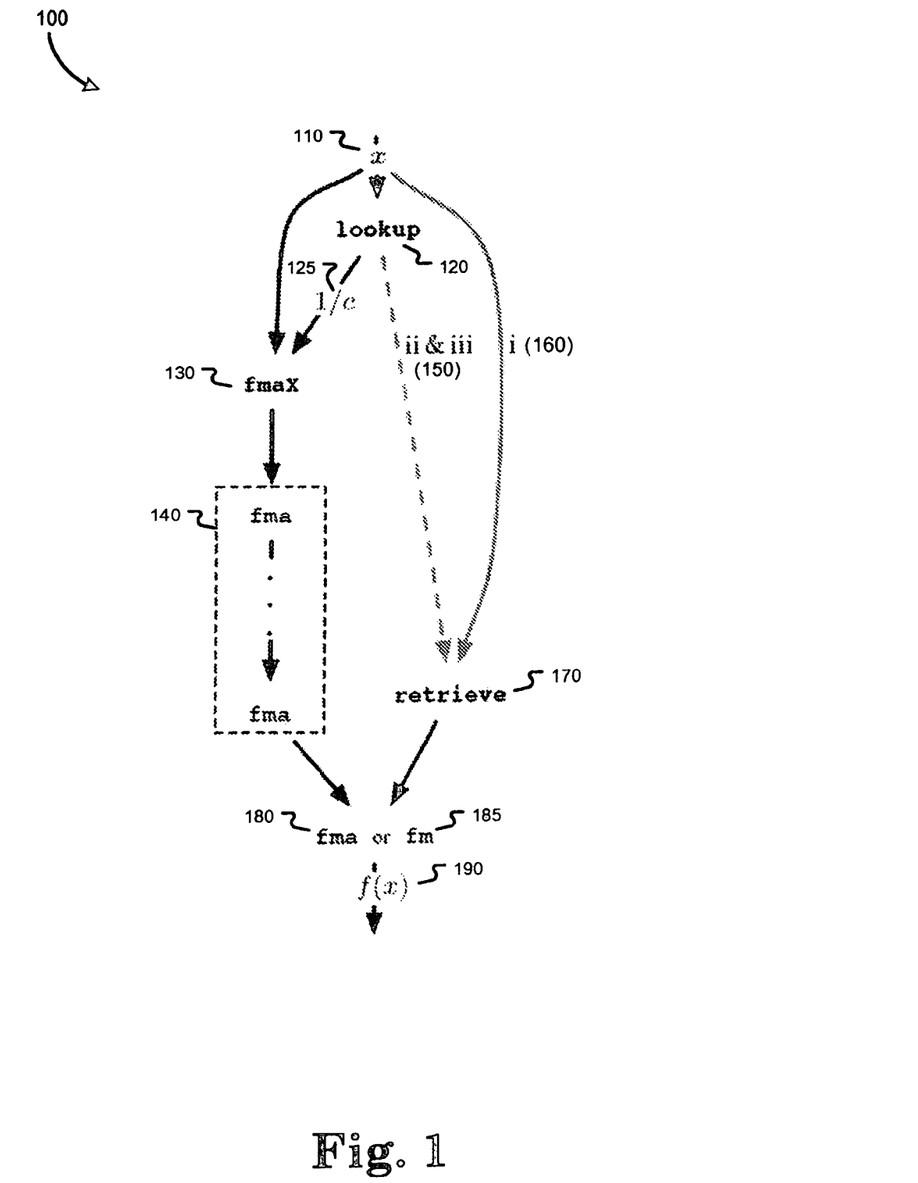
FIG. 1 provides an illustration of a data flow graph implementing the presently described hardware instructions according to one embodiment of the present invention.

Use of these instructions may be illustrated through the use of a data flow graph as depicted in FIG. 1. Except for processing required for exponential functions, all of the data flow paths are the same for elementary function processing of value x 110. FIG. 1 only shows the dataflow (omitting register constants). All of the floating-point instructions also take constant arguments which are not shown. For example, the fmaX instruction 130 takes an argument which is 1.

More specifically, FIG. 1 depicts a data flow 100 showing the interaction and use of floating-point instructions 120, 130, 140 to process computation of vertices, log x, roots, and reciprocals. As depicted, only the execution of the final instruction varies—fma 180 for log x and fm 185 for the roots and reciprocals.

In FIG. 1, the dotted box 140 illustrates the execution of a varying number of fused multiply-adds (fma instructions) used to evaluate a polynomial after a multiplicative range reduction is performed by the fmaX instruction 130. For typical table sizes, these polynomials are always of order three, so the result of the polynomial (the left branch of the data flow 100) is available four floating-point operations later (typically about 24-28 cycles) than the result 1/c 125.

The lookup instruction 120 performs a first table look-up, with this value being divided by one as shown in operation 1/c 125. The retrieve instruction 170 performs a second table look-up. For example, when computing logx, the instruction looks up $\log_2 c$, and substitutes exceptional results ($\pm\infty$, $\pm 0$, NaN) when necessary. The final fma 180 or fm instruction 185 combines the polynomial approximation on the reduced interval with the table value to produce a result 190.

The right branch of the data flow 100 indicates two data flows for three possible implementations:

Flow 160: i) The retrieve instruction is a second look-up, using the same input;

Flow 150: ii) The retrieve instruction retrieves a value saved by the look-up (in final or intermediate form) from a FIFO queue; and Flow 150: iii) The retrieve instruction retrieves a value saved in a slot according to an immediate tag which is also present in the corresponding lookup instruction 120.

In case i) 160, the dependency is direct. In cases ii) or iii) 150 the dependency is indirect, via registers internal to the execution unit handling the look-ups. All instruction variations have single register inputs and one or no outputs, so they will be compatible with existing in-flight instruction and register tracking. Compiler writers may prefer the variants with indirect dependencies, (ii) and (iii) 150, which reduce register pressure and simplify modulo loop scheduling. In these cases, the input value is only used twice by the lookup and retrieve instructions, after which the register can be reassigned, while the retrieve instruction 170 can be scheduled shortly before its result is required. The case (i) 160, on the other hand, results in a data-dependency graph containing a long edge connecting the input to the last instruction. In simple loops, like a vector library function body, architectures without rotating register files will require as many copy instructions as stages in order to modulo schedule the loop. On many architectures, this cannot be done without a performance degradation.

The variant of case (iii) requires additional instruction decode logic, but may be preferred over (ii) because tags allow lookup and retrieve instructions to execute in different orders, and for wide superscalar processors, the tags can be used by the unit assignment logic to ensure that matching lookup and retrieve instructions are routed to the same units. On Very Long Instruction Word machines, the position of lookup and retrieve could replace or augment the tag.

In low-power environments, the known long minimum latency between the lookup and retrieve instructions would enable hardware designers to use lower power but longer latency implementations of most of the retrieve instructions 170.

To facilitate scheduling, it is recommended that the FIFO or tag set be sized to the power of two greater than or equal to the latency of a floating-point operation. In this case, the number of registers required will be less than twice the unrolling factor, which is much lower than what is possible for code generated without access to such instructions.

The combination of small instruction counts and reduced register pressure eliminate the obstacles to in-lining these functions. For enhanced performance, the lookup 120 and retrieve 170 instructions should be handled by either a load/store unit, or, for vector implementations with a complex integer unit, by that unit. This code is bottlenecked by floating-point instructions, so moving computation out of this unit will increase performance.

The following section details how exceptional values may be handled using the instructions and the data flow described above, followed by the specifics of the lookup instruction processing for log x, which is somewhat more complicated than the other elementary functions.

Exceptional Values and fmax Instruction Processing

The key advantage of the presently disclosed hardware instructions is that the complications associated with exceptional values ($\pm 0$, $\pm\infty$, NaN, and values which over- or underflow at intermediate stages) are internal to the instructions, eliminating even cold branches and predicated execution. Iterative methods with table-based seed values cannot achieve this in most cases because a) in 0 and $\pm\infty$ cases the iteration multiplies 0 by $\infty$ producing a NaN; and b) to prevent over/underflow for high and low input exponents, matched adjustments are required before and after polynomial evaluation or iterations.

By using two table-based instructions, one to look up the value used in range reduction and one to look up the value of the function corresponding to the reduction, and introducing an extended-range floating-point representation with special handling for exceptions, this embodiment of the present invention can handle both types of exceptions without extra instructions.

In the case of subnormal inputs, the value $2^{-e+52}/c$ returned by the lookup instruction is a normal extended-range value. In this case, e−52 is the exponent of the leading nonzero bit of the input's mantissa. The extended-range number is biased by +2047, and the top binary value (4095) is reserved for $\pm\infty$ and NaNs and 0 is reserved for $\pm 0$ similar to IEEE floating-point standards. When these values are supplied as the first argument of fmaX, they override the normal values, and fmaX simply returns the corresponding IEEE bit pattern. (This is demonstrated by the values defined in the table of FIG. 4). The retrieve instruction returns an IEEE double-precison number except when used for divide, in which case it also returns an extended-range result.

Figure 2:
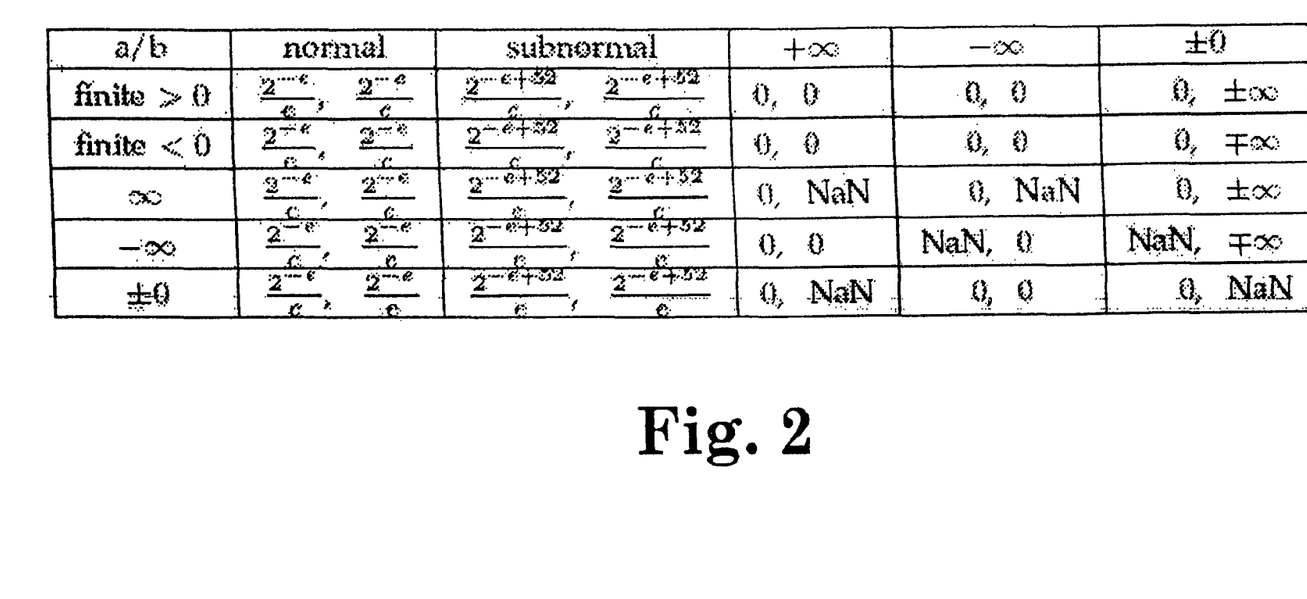
FIG. 2 depicts a illustration of a table providing values returned by lookup and retrieve instructions for floating-point inputs in accordance with one embodiment of the present invention.

FIG. 2 provides a table which summarizes how each case is handled. Each cell contains the value used in the reduction, followed by the corresponding function value. The first is given as an extended-range floating-point number which trades one bit of precision in the mantissa with a doubling of the exponent range. For the purposes of special function evaluation, subnormal extended-range floating-point numbers are not needed, so they do not need to be supported in the floating-point execution unit. As a result, the modifications to support extended-range numbers as inputs are minor.

More specifically, FIG. 2 indicates the values returned by lookup, retrieve instructions, for IEEE floating-point inputs $(-1)^s 2^e f$, which rounds to the nearest integer $I=\text{rnd}((-1)^s 2^e f)$. In case of exp2, inputs <−1074 are treated as −∞ and inputs >1024 are treated as ∞. For inputs <−1022, subnormal numbers are created for the second look-up.

Figure 3:
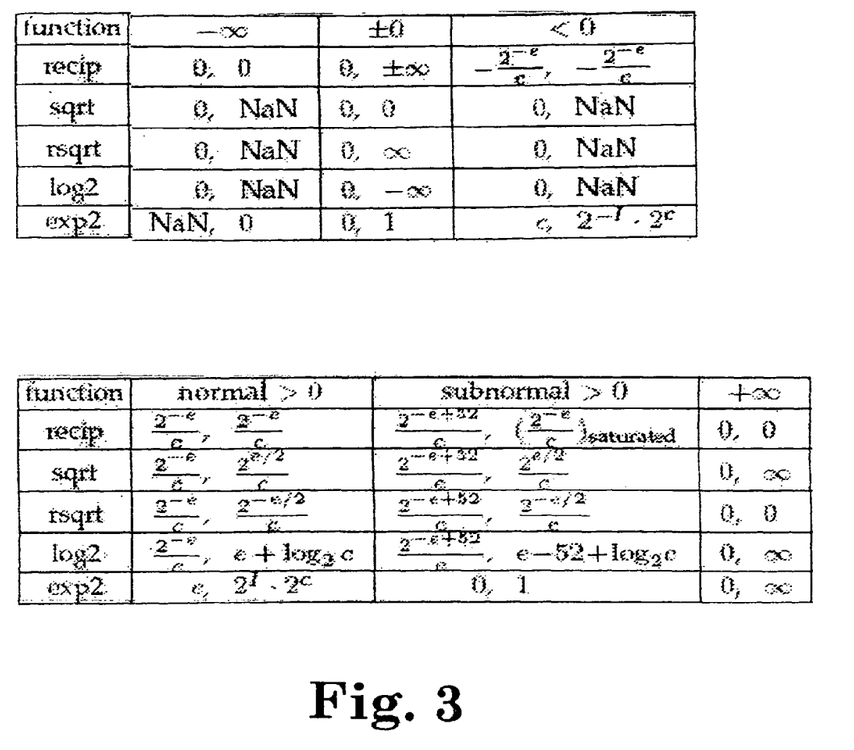
FIG. 3 provides an illustration of a table providing values returned by $\text{lookup}_{div}$, $\text{retrieve}_{div}$ instructions for floating-point inputs in accordance with one embodiment of the present invention.

FIG. 3 depicts a table indicating values returned by lookup$_{div}$, retrieve$_{div}$, instructions, for IEEE floating-point inputs $a=(-1)^s 2^e f$ and $b=(-1)^s 2^e fq$. Both look-up values are extended precision. Range Reduction (via the fmaX instruction) consuming the lookup value produces 0 in the case of exceptional input values, so that exceptional cases do not produce NaNs during polynomial evaluation. The retrieve value is multiplied by the numerator using a second fmaX instruction, which saturates to 0 and $\pm\infty$, accordingly. In the case of exceptional inputs, the retrieve value is the same as the exceptional result and fmaX passes it through. The exponent of the denominator is e. The numerator is only checked for exceptions.

The tables in FIGS. 2 and 3 provide simulated values for 64-bit floating-point numbers. The same approach would work for 32-bit values, but new table values would be required, even though the tables would be much smaller. Moreover, simulated values could be defined and provided for values of any precision.

Consider, for example, the first row of FIG. 2, with function recip which computes 1/x with normal positive input. Although the abstract values are both $2^{-e}/c$, the bit patterns for the two look ups are different. This means that 1/c must be representable in both formats. In the next cell, however, for some subnormal inputs, $2^{-e}/c$ is representable in the extended-range, but not in IEEE floating-point, because the addition of subnormal numbers makes the exponent range asymmetrical. As a result the second value may be saturated to $\infty$. The remaining cells in this row show that for $\pm\infty$ input, return 0 from both lookup and retrieve instructions, but for $\pm 0$ inputs lookup returns 0 and retrieve returns $\pm\infty$. In the last column we see that for negative inputs, the returned values change the sign. This ensures that intermediate values are always positive, and allows the polynomial approximation to be optimized to give correctly rounded results on more boundary cases. Both lookup and retrieve return quiet NaN outputs for NaN inputs.

Contrast this with the handling of approximate reciprocal instructions. For the instructions to be useful as approximations 0 inputs should return $\infty$ approximations and vice versa, but if the approximation is improved using Newton-Raphson, then the multiplication of the input by the approximation produces a NaN which propagates to the final result.

The other cases depicted in FIG. 2 are similar in treating 0 and $\infty$ inputs specially. The noteworthy variations are that $\log_2 x$ multiplicatively shifts subnormal inputs into the normal range so that the normal approximation can be used, and then additively shifts the result of retrieve to compensate; and $2^x$ returns 0 and 1 for subnormal inputs, because the polynomial approximation produces the correct result for the whole subnormal range.

Finally, for exponential functions, which return fixed finite values for a wide range of inputs (including infinities), it is necessary to override the range reduction so that it produces an output which results in a constant value after the polynomial approximation. In the case of exponential, any finite value which results in a non-zero polynomial value will do, because the retrieve instruction returns 0 or $\infty$ and multiplication by any finite value will return 0 as required.

Figure 4:
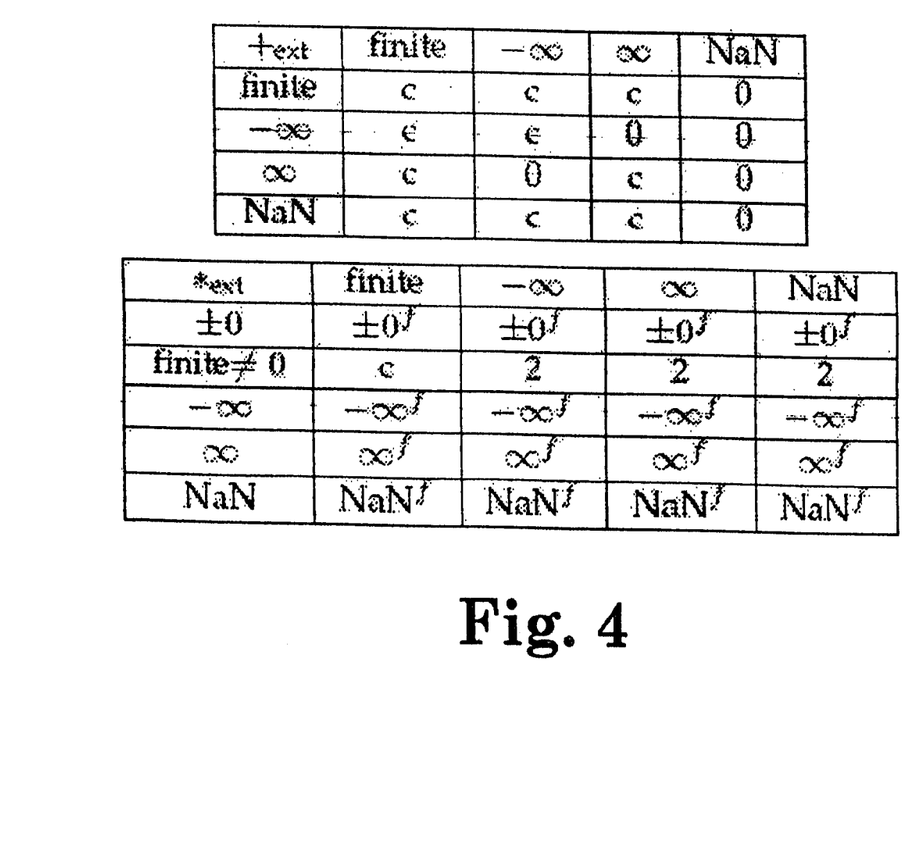
FIG. 4 provides an illustration of a table providing exceptional values returned by the fmaX instruction in accordance with one embodiment of the present invention.

To handle such cases, the behavior of fmaX may be modified for exceptional values, to suppress some exceptional values. FIG. 4 demonstrates this exceptional behavior. Only the first input of fmaX is in the extended-range format. The second multiplicand, the addend, and the result are all IEEE floats.

As shown within FIG. 4, special treatment of exceptional values by fmaX follows from special treatment in addition and multiplication. The first argument is given by the row and the second argument by the column. Conventional treatment is indicated by a "c", and unusual handling by specific constant values. The only input with extended-range is the first argument. All exceptional values detected in this argument are converted to the IEEE equivalent and become the output of the fmaX instruction, as indicated by superscript$^f$ (for final). The multiplication of finite values could saturate to $\pm\infty$, if the addend is $\infty$ with the opposite sign, then the result is zero. If the addend is a NaN, then the result is zero.

Look-Up Processing

As discussed above, the lookup and retrieve instructions perform similar operations for each elementary function. The function number may be specified as an immediate value. In other embodiments, for example, in assembly language the different functions could be represented as different instructions with the mathematical function as part of the name, while in high level languages the instructions could be represented by a single function returning two values (or a structure).

Figure 5A:
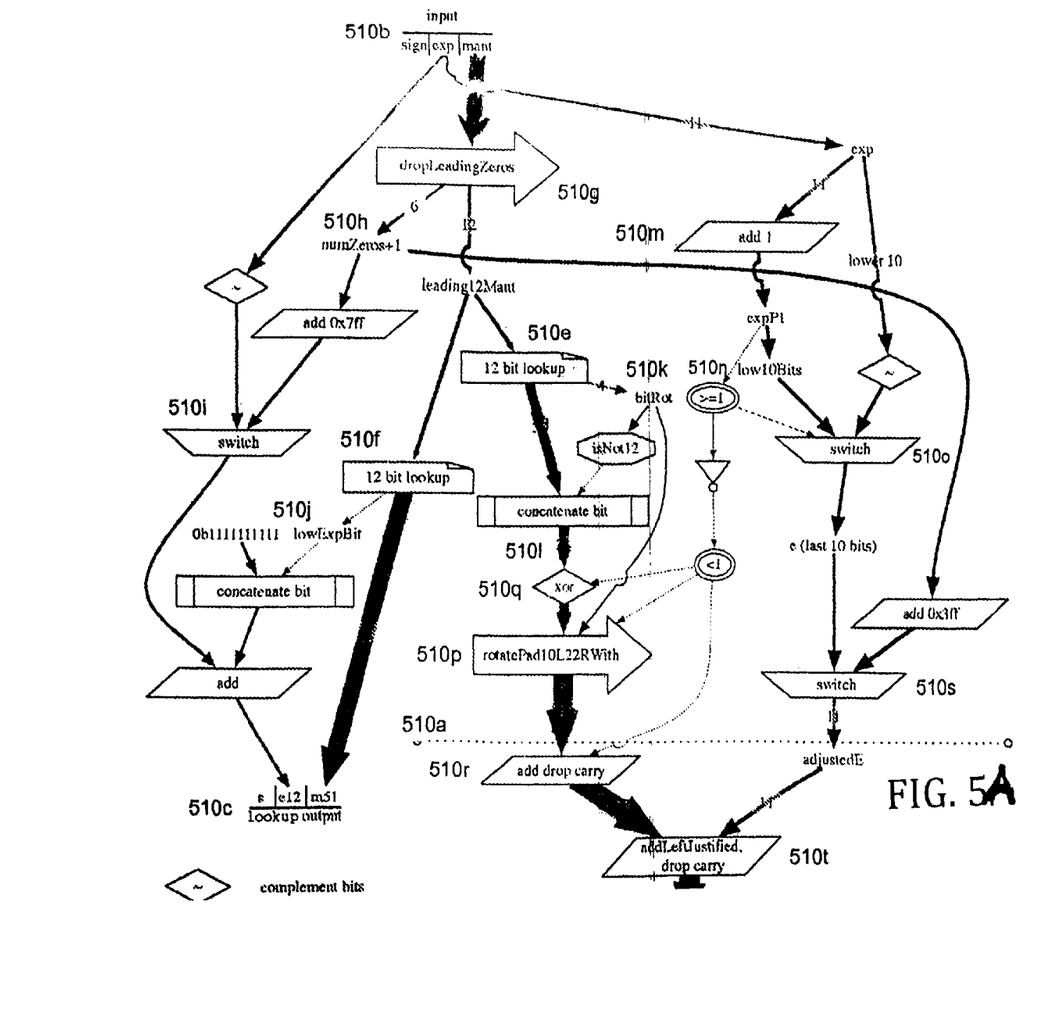
FIG. 5 provides an illustration of a bit flow graph with operations on vertices for $\log_2 x$ computation in accordance with one embodiment of the present invention.
Figure 5B:
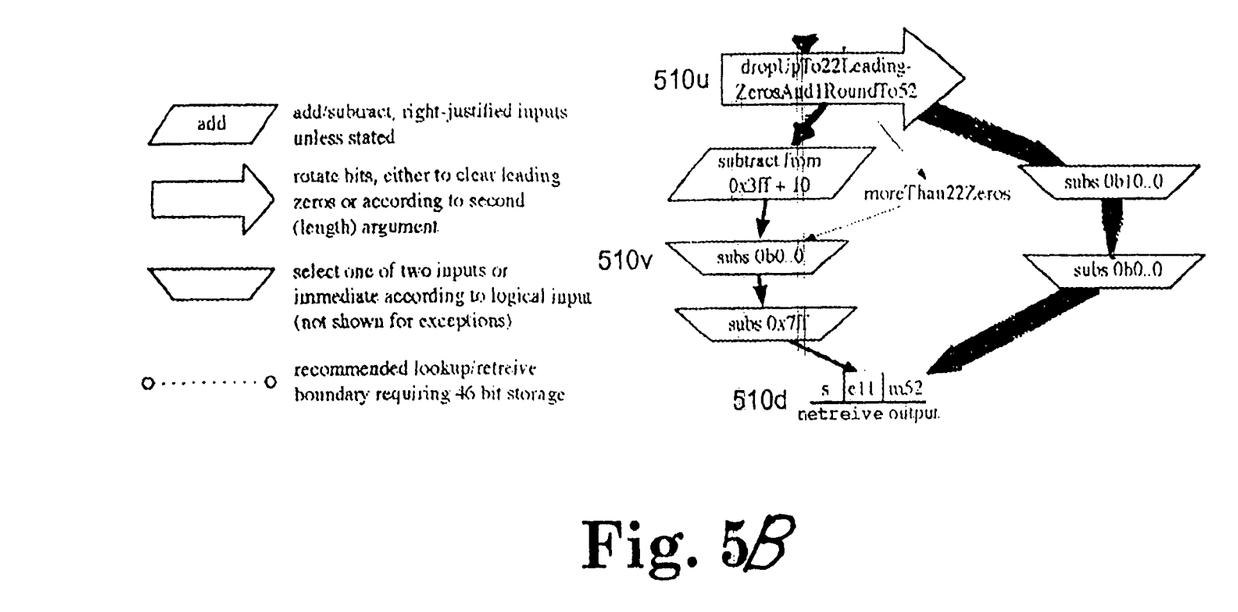

A simplified data-flow for the most complicated case, $\log_2 x$, is represented in FIG. 5. The simplification is the elimination of the many single-bit operations necessary to keep track of exceptional conditions. The operations to substitute special values are still shown. The purpose of this diagram is to show that the operations around the core look-up operations are of low complexity. This representation is for variant (ii) or (iii) for retrieve and includes a dotted line (510a) showing a possible set of values to save at the end of the lookup instruction with the part of the data flow below the line computed in the retrieve instruction.

Specifically, FIG. 5 demonstrates a bit flow graph with operations on vertices, for log x look-up. Each object's shape indicates operation type, and line width indicates data paths width in bits. The input (510b) is used to generate two values (510c) and (510d), $2^{-e}/\mu$ and $e+\log_2 \mu$ in the case of $\log_2 x$. The heart of the operation is two look-up operations (510e) and (510f), with a common index. In implementation (i) the look ups would be implemented separately, while in the shared implementations (ii) and (iii) the look-ups would probably be implemented together.

Partial decoding of subnormal inputs (510g) is required for all of the functions except the exponential functions. Only the leading non-zero bits are needed for subnormal values, and only the leading bits are needed for normal values, but the number of leading zero bits (510h) is required to properly form the exponent for the multiplicative reduction. The only switch (510i) needed for the lookup instruction output switches between the reciprocal exponents valid in the normal and subnormal cases respectively. Accurate range reduction for subnormals requires both extreme end points, e.g. ½ and 1, because these values are exactly representable. As a result, two exponent values are required, and we accommodate this by storing an exponent bit (510j) in addition to the 51 mantissa bits.

On the right hand side, the look up (510e) for the retrieve operation also looks up a 4-bit rotation, which also serves as a flag. 4 bits are needed because the table size $2^{12}$ implies that we may have a variation in the exponent of the leading non-zero bit of up to 11 for nonzero table values. This allows us to encode in 30 bits the floating mantissa used to construct the retrieve output. This table will always contain a 0, and is encoded as a 12 in the bitRot field. In all other cases, the next operation concatenates the implied 1 for this floating-point format. This gives us an effective 31-bits of significance (510l), which is then rotated into the correct position in a 42-bit fixed point number. Only the high-order bit overlaps the integer part of the answer generated from the exponent bits, so this value needs to be padded. Because an IEEE floating-point number is the output, the contribution of the (padded) value to the mantissa of the output will depend on the sign of the integer exponent part. This sign is computed by adding 1 (510m) to the biased exponent, in which case the high-order bit is 1 if and only if the exponent is positive. This bit (510n) is used to control the sign reversal of the integer part (510o) and the sign of the sign reversal of the fractional part, which is optimized by padding (510p) after xoring (510q) but before the +1 (510r) required to negate a two's-complement integer.

The integer part has now been computed for normal inputs, but the value needs to be switched (510s) for subnormal inputs obtained by biasing the number of leading zeros computed as part of the first step. The apparent 75-bit add (510t) is really only 11 bits with 10 of the bits coming from padding on one side. This fixed-point number may contain leading zeros, but the maximum number is $\log_2$ ((maximum integer part)−(smallest nonzero table value))=22, for the tested table size. As a result the normalization (510u) only needs to check for up to 22 leading zero bits, and if it detects that number set a flag to substitute a zero for the exponent (510v) (the mantissa is automatically zero). The final switches substitute special values for ±∞ and a quiet NaN.

Operating System Support

If the variants (ii) or (iii) are implemented, the hidden registers will require operating system support on operating systems supporting preemptive context switches. Either new instructions to save and restore the state of the hidden registers, or additional functionality for existing context switching support instructions will be required.

Alternatively, the processor could delay context switches until the hidden registers are no longer in use, or the process model could avoid the need for context switches altogether.

Performance

Since the dependency graphs (as illustrated in FIG. 2) are nearly linear, the performance of software pipelined loops will be proportional to the number of floating-point instructions. It may be possible to improve the accuracy of div and the exponential functions by taking rounding into account when searching for both tables and polynomial values to reduce the maximum error. Overall, the improvement provided by hardware instructions may vary by architecture, but may result in a 2.2× or more improvement.

As explained above, considerable performance and accuracy improvements may be achieved in fixed power calculations by combining multiplicative reduction using a fused multiply-add and accurate (or exact) tables. This may result in particularly large increases in throughput, especially for architectures that have poorly implemented seeds for double-precision iterative methods.

In further embodiments, to further reduce register pressure, variants of the new instructions with a hidden internal state may be used, taking into account the impact of such a decision on superscalar dispatch and required operating system support. In appropriate cases, software architects should include similar instructions in hardware aimed at higher performance numerical computation.

Although not extensively discussed above, the presently disclosed techniques are equally applicable to higher- and lower-precision functions, although the table sizes and polynomial orders should be adjusted if only processing 32-bit floating-point numbers or when greater performance is required in processing 128-bit (or higher) floating-point numbers. Quad precision floating-point numbers are often represented as two double-precision numbers with different exponents, often called double-doubles. Further, the fmaX instruction could be extended to solve a problem with double-doubles, in that near the top and bottom of the double-precision exponent range, the two mantissas overlap. The look-up instructions described herein could be used for this format, by using the high-order double as the input. Improving the functioning of double-double arithmetic may also be possible by using a more general fmaX instruction to extend the exponent range of one or both of the component doubles.

As will be appreciated by one skilled in the art, aspects of the present invention may be embodied within a system, a method, a specified structure in computer hardware, as a hardware or software instruction, or computer program product. Accordingly, aspects of the present invention may take the form of an entirely hardware embodiment, an entirely software embodiment (including firmware, resident software, micro-code, etc.) or an embodiment combining software and hardware aspects. Further, the aspects of the present invention may be embodied in a computer readable storage medium which may be, for example, but is not limited to, an electronic, magnetic, optical, electromagnetic, infrared, or semiconductor system, apparatus, or device, or any suitable combination of the foregoing.

Aspects of the present invention are described herein with reference to illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, might be implemented by a computer program or other electronic instructions. This computer program or instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A system for performing mathematical function evaluation, comprising:
   a plurality of tables providing values for processing a plurality of mathematical functions; a processing unit comprising logic interfacing with the plurality of tables, the logic
further comprising:
   a first hardware instruction configured to lookup a first value for use in a first stage of evaluation for a mathematical function, the first value retrieved from one of the plurality of the tables;
   a second hardware instruction configured to retrieve a second value for use in a second stage of evaluation for the mathematical function, the second value used retrieved from the table to be used in conjunction with the first value retrieved by the first instruction;

said retrieving of the second value being performed by using the same input as the first hardware instruction, using a value saved by a lookup from a FIFO queue, or using a value saved in a slot according to an immediate tag provided to the second hardware instruction; and a third hardware instruction configured to perform an extended-range fused multiply-add operation, the extended-range fused multiply-add operation performing a range reduction on the mathematical function using the first value.

2. The system of claim 1 wherein the plurality of mathematical functions include reciprocals, square roots, cube roots, fourth roots, roots to a defined power, and functions from exponential and logarithmic families.

3. The system of claim 1, wherein the third hardware instruction is defined to accept a first argument having 12 exponent bits and 51 mantissa bits, and a second argument and a third argument each having 11 exponent bits and 52 mantissa bits.

4. The system of claim 1, wherein the plurality of tables and the processing unit is contained in a processor selected from the group consisting of a scalar processor, a single instruction multiple data (SIMD) processor, and a vector processor.

5. The system of claim 1, wherein the third hardware instruction Substitutes one of +∞, -∞, 0, -0, or NaN for exceptional values to the plurality of mathematical functions.

6. A computer-implemented method for using hardware instructions to accelerate table-driven evaluation of mathematical functions, comprising:

providing a table used for generating values of a plurality of mathematical functions;

executing a first hardware instruction to lookup a first value for use in a first stage of evaluation for a mathematical function, the first value retrieved from the table;

executing a second hardware instruction to retrieve a second value for use in a second stage of evaluation for the mathematical function, the second value retrieved from the table to be used in conjunction with the first value retrieved by the first hardware instruction; and said retrieving of the second value being performed by using the same input as the first hardware instruction, using a value saved by a lookup from a FIFO queue or using a value saved in a slot according to an immediate tag provided to the second hardware instruction;

executing a third hardware instruction to perform an extended-range fused multiply-add operation, the extended-range fused multiply-add operation performing a range reduction on the mathematical function using the first value;

wherein the mathematical function is computed with a single iteration of each of the first hardware instruction, second hardware instruction, and the third hardware instruction, and wherein the first floating-point instruction, second floating-point instruction, and the third floating-point instruction are executed in the processor as a branch-free sequence of instructions.

7. The method of claim 6, wherein the first value retrieved from the table is used to calculate the difference between the input and an other reference value, and the second value: retrieved from the table is either a value of the mathematical function at the other reference value, or a value related to the other reference value.

8. The method of claim 6, wherein the plurality of mathematical functions include reciprocals, square roots, cube root, fourth roots, roots to a defined power, and functions from exponential and logarithmic families.

9. The method of claim 6, wherein the third hardware instruction is defined to accept a first argument having 12 exponent bits and 51 mantissa bits, and a second argument and a third argument each having 11 exponent bits and 52 mantissa bits.

10. The method of claim 6, wherein the third hardware instruction substitutes one of +∞, -∞, 0, -0, or NaN for exceptional values to the plurality of mathematical functions.

* * * * *